United States Patent [19]

Leone-Bay et al.

[11] Patent Number: 5,021,540

[45] Date of Patent: Jun. 4, 1991

[54] POLYIMIDES FROM DIAMINOBENZOTRIFLUORIDES

[75] Inventors: Andrea Leone-Bay; Steven L. Peake, both of Ridgefield; Stanley S. Kaminski, Stamford, all of Conn.

[73] Assignee: American Cyanamid, Me.

[21] Appl. No.: 584,561

[22] Filed: Sep. 18, 1990

[51] Int. Cl.$^5$ .............................................. C08G 63/00
[52] U.S. Cl. ................................... 528/183; 525/436; 528/353
[58] Field of Search ................. 528/183, 353; 525/436

[56] References Cited

U.S. PATENT DOCUMENTS

| | | | |
|---|---|---|---|
| 4,690,999 | 9/1987 | Numata et al. | 528/188 |
| 4,876,329 | 10/1989 | Chiang et al. | 528/353 |
| 4,973,661 | 11/1990 | Lee et al. | 528/125 |

*Primary Examiner*—Morton Foelak
*Attorney, Agent, or Firm*—Steven Flynn

[57] ABSTRACT

Polyimides are made by imidization of the product of reaction of dianhydrides with diaminobenzotrifluoride and bis(trifluoromethyl) oxydianilines. In preferred embodiments the polyimides are end capped with monoanhydride or monoamine residues.

4 Claims, No Drawings

POLYIMIDES FROM DIAMINOBENZOTRIFLUORIDES

The invention relates to novel polyimides useful for making composites and adhesives and more particularly to polyimides made from the product of condensation of an aromatic dianhydride (or a corresponding acid-ester or polycarboxylic acid) and an aromatic diamine which has at least one trifluoromethyl radical attached to an aromatic ring. Further, the invention provides polyimide resins which are end-capped by reaction of a diamine-dianhydride reaction product with a monoamine or a monoanhydride which may or may not have a second reactive functional group to provide reactive or non-reactive end-caps on the polyimide.

It is known to make polyimides by thermal imidization of the intermediate polyamic acid obtained by reaction of a dianhydride (or a corresponding acid-ester or tetracarboxylic acid) and a diamine. Polyimides from the product of reaction of 3,5-diaminobenzotrifluoride and dianhydrides (or corresponding esters or acids) were described in U.S. Pat. No. 4,876,329. Only the diamine-dianhydride reaction products and imides from those were described.

The present invention provides novel polyimide resins made from the reaction products of dianhydrides and diamines having two aminobenzotrifluoride radicals. The invention further provides polyimide resins made from the product from reaction of a dianhydride with a diaminobenzotrifluoride or a diamine having two aminobenzotrifluoride radicals and which have been end-capped by reaction of the diaminedianhydride reaction product with a monoamine or a monoanhydride. The end caps may be either reactive or non-reactive.

In one embodiment of the invention we make end-capped polyimide resins from the reaction products of 3,5-diaminobenzotrifluoride and dianhydrides (or corresponding ester or acid).

In another embodiment of the invention we make novel polyimide resins by reaction of dianhydrides with diamines which have two aminobenzotrifluoride moieties in the molecule, including such resins which have been end-capped by further reaction with a monoamine or a monoanhydride.

The thermosetting resins of the invention produce cured polyimides having excellent stability at high temperatures. These are especially useful for making composites and adhesives for high temperature applications.

Diamines used for making polyimides of the invention are:

1. diaminobenzotrifluorides such as 3,5-diaminobenzotrifluoride (3F) of the formula

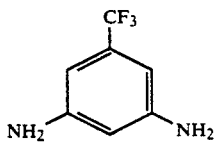

and isomers thereof, and 2. bis (trifluoromethyl) oxydianilines such as 4,4'-(2,2'-bistrifluoromethyl) oxydianiline (FOD) which has the structural formula

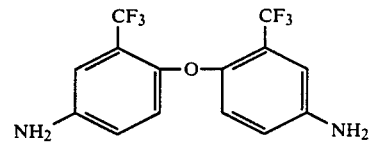

and its isomers.

This diamine (FOD) was described as an intermediate in the synthesis of diisocyanates, by Maki, Y. and Inukai, K. at Nippon Kagaku Kaishi (3), 675-7 (Japan) 1972. See Chem, Abstracts 77 (9): 61435 g. Three isomeric bis(trifluoromethyl dinitrophenyl) ethers were obtained by reaction of chloronitrobenzotrifluorides with alkali metal carbonates. The dinitro-compounds were reduced by Sn-HCl to make the diamines.

Dianhydrides useful for making polyimides of the invention are dianhydrides having at least one aromatic ring in the molecule. Some preferred dianhydrides of this class are:

3,3',4,4'-benzophenone tetracarboxylic dianhydride (BTDA), pyromellitic dianhydride (PMDA), 2,2-bis(3,4-dicarboxyphenyl)hexafluoropropane dianhydride (4F), 3,3',4,4'-sulfonyldiphthalic anhydride (DPSA), 3,3',4,4-diphenyl dianhydride (BPTDA), oxydiphthalic anhydride (ODPA), and similar dianhydrides.

The general reactions of diamines with dianhydrides, or with diesterdiacids, to make linear polyimides are known and need not be described in detail here. In the direct reaction of diamine and dianhydride, a polyamic acid intermediate is formed, and the intermediate proceeds by imidization when heated to form the polyimide. In another reaction scheme, the anhydride is opened by hydration or partial esterification to form intermediates which are then reacted with the diamine to form the intermediate and then the polyimide. The descriptions and definitions herein of polyimides made from the reaction product of a diamine and a dianhydride include within their scope polyimides of the same composition which may be made from the product form reaction of the same diamine with a diester diacid or a poly carboxylic acid (e.g. tetraacid derivative) which corresponds to the same dianhydride.

The invention will be described in more detail below by reference to specific examples, which include our presently most preferred mode of carrying out the invention.

EXAMPLE 1

Polyimide from reaction of a dianhydride and a bis(-trifluoromethyl)oxydianiline.

A mixture of 620 mg (2.84 mM) pyromellitic dianhydride (PMDA) and 960 mg (2.84 mM) 4,4'-(2,2'-bistrifluoromethyl) oxydianiline (FOD) in 10 ml N-methylpyrrolidinone solvent is heated to 80°-100° C. over a period of about 15 minutes with stirring until a product solution is obtained. After cooling to room temperature, about one ml of the solution is coated onto each of several glass-fiber tapes. Each tape is 12.7 mm wide, 89 mm long and 0.18 mm thick. The coated tapes are dried at 200° C. in circulating air for 1 to 2 hours and then cured under nitrogen at 315° C. for 12 hours. The cured tapes are tested to determine Tg ° C. (tan delta and 5% offset) for the cured resin and to determine resin weight retention.

Measurement of Tg (tan delta and 5% offset)

The cured resin-coated glass tapes are cut to a length of 31.8 mm and Dynamic Mechanical Analyses (DMA) are performed on each sample to determine the resin's glass transition temperatures (tan delta and 5% offset). The DuPont 982 DMA was used with horizontal grips at a test span of 16.5 mm, an oscillation amplitude of 0.1 mm and a heating rate of 10° C./min.

Measurement of Isothermal Stability (Resin Weight Retention)

The cured resin-coated glass tapes are cut to a length of 5-10 cm. Each tape is measured to the nearest 0.25 mm and placed in a 4 dram vial. The tapes are conditioned at 25° C. for 17 hours. The tapes are allowed to cool to room temperature and weighed. The resin weight is determined by subtracting the unit length weight of the uncoated tape, multiplied by the speciman length, from the specimen weight. All the samples are then placed in an air circulating oven which has been preheated to 343° C. After 100 hours at 343° C. the vials are removed and allowed to cool at room temperature. Each tape is weighed and the resin weight retention is calculated.

EXAMPLE 2

By the procedure described in Example 1, other intermediates for making polyimides were prepared by reaction of other dianhydrides with the same bis(trifluoromethyl) oxydianiline, i.e. FOD, and by reaction of the same dianhydrides with 3,5-diamino benzotrifluoride. The intermediates were coated on tapes, cured and tested as described in Example 1.

In Table 1, are tabulated the results from testing samples of the polyimides described in Examples 1 and 2. The results are tabulated by reference to the specific dianhydride and the specific diamine reactants that were used for making each polyimide. In the Tables, abbreviations representing the reactant monomers are:

Dianhydrides

PMDA = pyromellitic dianhydride
6F = 2,2-bis(3,4-dicarboxyphenyl) hexafluoropropane dianhydride
BTDA = 3,3',4,4'-benzophenone tetracarboxylic dianhydride
ODPA = 3,3',4,4'oxydiphthalic anhydride
BPTDA = 3,3',4,4'-diphenyl tetracarboxylic dianhydride
DPSA = 3,3',4,4'-sulfonyldiphthalic anhydride

Diamines

3F—3,5 diamino benzotrifluoride
FOD—4,4'(2,2'bistrifluoromethyl)oxydianiline

TABLE I

| | NON END CAPPED POLYIMIDES | | |
|---|---|---|---|
| COM-POUND | MONOMERS | Tg °C. (5% offset) | % WT. RETENTION (343° C./100 hrs) |
| 1 | PMDA/3F | 407 (379) | 99 |
| 2 | 6F/3F | 309 (287) | 100 |
| 3 | BTDA/3F | 312 (289) | 99 |
| 4 | ODPA/3F | 299 (276) | 95 |
| 5 | BPTDA/3F | 368 (321) | 100 |
| 6 | DPSA/3F | 326 (298) | 99 |
| 7 | PMDA/FOD | 413 (431) | 89 |
| 8 | 6F/FOD | 434 (392) | 96 |
| 9 | BTDA/FOD | 426 (383) | 92 |
| 10 | ODPA/FOD | 410 (374) | 94 |
| 11 | BPTDA/FOD | 454 (395) | 96 |
| 12 | DPSA/FOD | 457 (405) | 92 |

Results reported in Table 1 demonstrate significantly higher glass transition temperature for the polyimide resins made from various dianhydrides and the FOD diamine as compared with resins made from the same dianhydrides and the 3F diamine. The thermal stability was good to excellent for all of the resins tested.

In Examples 1 and 2, the molar proportions of the dianhydride and diamine reactants are equal, so the molecular weight of the product is not controlled by the reactant ratio and the end groups on the polymers are randomly either dianhydride or diamine units. The number (average) of repeated units in the polymer, and the composition of the end groups can be controlled by using different molar proportions of the dianhydride and diamine.

For example, using a molar ratio of two moles dianhydride to three moles diamine, we obtain a linear polymer having an average of two repeated units and having only diamine end groups on the polymers. By the term repeated unit we mean a section of the polymer having the polymerized residues from one dianhydride and one diamine. For making polymers which are to be end-capped with a monoamine, we first make the polymer with excess dianhydride to obtain polymers with only dianhydride end groups, which can then react with a monoamine to end-cap the polymer at both ends. Conversely, we may use a molar excess of diamine to make polymers having amino end groups which are to be end-capped by reaction with a monoanhydride. Some preferred monoamines for use to end cap the reaction product of an excess of dianhydride with polyamine, include p-amino styrene, p-amine stilbene, and 2-amino-4,5-dicyanoimidazole, for example. Some preferred monoanhydrides for use to end cap the reaction product of excess diamine with dianhydride include nadic anhydride and phthalic anhydride, for example.

EXAMPLE 3

A mixture of PMDA (2.0 g; 9.17 mM) and 3F (2.4 g, 13.8 mm) is dissolved in 15 ml N-methylpyrrolidinone. the solution, having mole ratio of two dianhydride to three diamine is heated to 80°-100° C. over a period of about 15 minutes, with stirring. A golden solution of the reaction product is obtained. The polymer product has two repeating units and has diamine residues as end groups. To the reaction product solution, still at 80°-100° C., is added 1.5 g (9.17 mM) of nadic anhydride (NA) and the mixture is stirred until a product solution is obtained. The product is endcapped by reaction with nadic anhydride. The solution is cooled to room temperature. Glass filter tapes are imbibed with the solution, dried, cured and tested for Tg (tan delta and 5% offset), and resin weight retention at 343° C. by the procedures described in Example 1.

EXAMPLE 4

The procedure of Example 3 is repeated several times, varying the mole ratio of anhydride to amine each time to vary the chain length of the polymer products. A product having one repeating unit is obtained by using a ratio of one mole dianhydride to two moles diamine. This is done by using 3.2 g (18.34 mM) instead of 2.4 g of 3F in the procedure of Example 3. A polymer having five repeating units (n=5) is obtained by using 1.9 g (11.0 mM) of 3F in the procedure of Example 3. A polymer having ten repeating units (N=10) is obtained by using 1.75 g (10.09 mM) of 3F in the procedure of Example 3. All of the polymers are end-capped with nadic anhydride by the procedure in Example 3. These products are tested for Tg (tan delta and 5% offset) and thermal stability by procedures described in Example 1 and the test results are tabulated in Table II. The cured polyimides of varied molecular weights had similar glass transition temperatures but it was observed that as the number of repeating units (n) was increased, the thermal stability of the cured resins improved substantially.

EXAMPLE 5

Polyimides having two repeating units (n=2) were made and tested by the procedures described in Example 3, using instead of PMDA, equimolar amounts (9.17 mM) of other dianhydrides as indicated in Table II. A series, of resins was made using each of the dianhydrides with 3F, and then a series was made using each of those dianhydrides in the same amounts and using the diamine FOD instead of 3F in an equimolar amount (13.8 mM). All of these resins were end-capped with NA. Each of these reins was tested as described in Example 1 and the test results are tabulated in Table II.

mg; 0.57 mM) and only ten ml. of the solvent N-methylpyrrolidone was used. To make the resins end-capped with PAST, 0.57 mM of that amine was used instead of PAS. The coated tapes were cured at 371° C. for 12 hours in nitrogen. Instead of using excess of the diamine reactant to provide amino end groups on the dianhydride - diamine reaction product, as in example 3, in this case we use excess dianhydride to provide anhydride end groups for reaction with the monoamine to make the end-caps.

EXAMPLE 7

Polyimides having ten repeating units (n=10) were made and tested by the procedures described in Example 6 using, instead of PMDA, equimolar amounts (3.13 mM) of other dianhydrides as indicated in Table III. A series of compounds was made using each of the dianhydrides with 3F and then using each of the dianhydrides with FOD. A complete series was made with end-caps from reaction with PAS and another complete series was made with PAST end-caps. All of the resins were tested. Results from testing the resins made and tested as described in Example 6 and 7 are tabulated in Table III.

EXAMPLE 8

Polyimides were prepared from diesters rather than an anhydride. The dimethylester of PMDA was prepared by refluxing a mixture of PMDA (20 g, 0.09 moles) in methanol (95 mL) for 30 minutes. The resulting solution was 1.01 M PMDA dimethylester in methanol. A portion of this PMDA dimethyl ester solution (7 mL, 9.17 mM) was diluted with methanol (10 mL) and NA dimethyl ester (1.8 g, 9.17 mM) was added. To this solution, 3F (2.4 g, 13.8 mM) was added and the mixture stirred at room temperature until a clear, amber solution resulted. The resin was coated on glass tape as described in Example 3. The coated tapes were dried in an air circulating oven as follows: 50° C./15 min., 100° C./15 min., 150° C./15 min. and 200° C./1 hr. The tapes were then cured and tested as described in Example 3.

TABLE II

REACTIVE END CAPPED POLYIMIDES
(n = 2 unless specified)

| COMPOUND | MONOMER | Tg °C. (5% offset) | % WT. RETENTION (343° C./100 HRS) |
|---|---|---|---|
| 1a | PMDA/3F/NA | 431 (421) | 77 |
| 1b | n = 1 | 416 (483) | 70 |
| 1c | n = 5 | 412 (377) | 89 |
| 1d | n = 10 | 424 (391) | 92 |
| 2 | 6F/3F/NA | 367 (322) | 93 |
| 3 | BTDA/3F/NA | 420 (381) | 85 |
| 4 | ODPA/3F/NA | 420 (408) | 76 |
| 5 | BPTDA/3F/NA | 434 (385) | 88 |
| 6 | DPSA/3F/NA | 429 (no offset) | 85 |
| 7 | PMDA/FOD/NA | >500 | 56 |
| 8 | 6F/FOD/NA | >500 | 76 |
| 9 | BTDA/FOD/NA | 412 (412) | 56 |
| 10 | ODPA/FOD/NA | 418 (no offset) | 47 |
| 11 | BPTDA/FOD/NA | 451 (no offset) | 77 |
| 12 | DPSA/FOD/NA | 413 (427) | 54 |

EXAMPLE 6

Polyimides having ten repeating units (n=10) and end capped by reaction with a monoamine are prepared and tested as follows. Amines used for the end-cap are p-amino styrene (PAS) or p-amino stilbene (PAST). The procedure for making and testing the resins as described in Example 3 was followed with the following exceptions. The dianhydride and diamine reactants were PMDA (682 mg; 3.13 mM) and 3F (500 mg.; 2.84 mM), the amine selected for the end-cap was PAS (68

TABLE III

REACTIVE END CAPPED POLYMERS.
(n = 10)

| COMPOUND | MONOMERS | Tg °C. (5% offset) | % WT. RETENTION 343° C./100 hrs) |
|---|---|---|---|
| 1 | PMDA/3F/PAS | 410 (378) | 91 |
| 2 | 6F/3F/PAS | 318 (295) | 98 |
| 3 | BTDA/3F/PAS | 427 (322) | 86 |

TABLE III-continued

| | REACTIVE END CAPPED POLYMERS. (n = 10) | | |
|---|---|---|---|
| COMPOUND | MONOMERS | Tg °C. (5% offset) | % WT. RETENTION 343° C./100 hrs) |
| 4 | ODPA/3F/PAS | 328 (297) | 97 |
| 5 | BPTDA/3F/PAS | 405 (321) | 95 |
| 6 | DPSA/3F/PAS | 362 (313) | 96 |
| 7 | PMDA/FOD/PAS | 413 (no offset) | 86 |
| 8 | 6F/FOD/PAS | 415 (382) | 96 |
| 9 | BTDA/FOD/PAS | 420 (376) | 94 |
| 10 | ODPA/FOD/PAS | 394 (349) | 94 |
| 11 | BPTDA/FOD/PAS | 438 (382) | 93 |
| 12 | DPSA/FOD/PAS | 411 (401) | 84 |
| 13 | PMDA/3F/PAST | 386 (306) | 88 |
| 14 | 6F/3F/PAST | 263 (241) | 95 |
| 15 | BTDA/3F/PAST | 273 (245) | 96 |
| 16 | ODPA/3F/PAST | 276 (232) | 95 |
| 17 | BPTDA/3F/PAST | 271 (225) | 94 |
| 18 | DPSA/3F/PAST | 310 (282) | 96 |
| 19 | PMDA/FOD/PAST | 414 (396) | 81 |
| 20 | 6F/FOD/PAST | 404 (361) | 96 |
| 21 | BTDA/FOD/PAST | 413 (364) | 92 |
| 22 | ODPA/FOD/PAST | 427 (373) | 90 |
| 23 | BPTDA/FOD/PAST | 404 (360) | 94 |
| 24 | DPSA/FOD/PAST | 458 (397) | 94 |

EXAMPLE 9

Polyimides end-capped by reaction of dianhydride-diamine reaction products with phthalic anhydride (PA), were prepared from several combinations of dianhydrides and diamines as identified in Table IV. The number of repeated units (n) in the several polymers was varied by varying the ratio of reactants for the preparation of each resin. The number of repeated units, n, in each resin is shown in Table IV. The general procedure described in Examples 3-7 was followed to make and test the resins. The reactants used to make each resin, and the test results from the tests are tabulated in Table IV.

TABLE IV

| | UNREACTIVE END CAPPED POLYIMIDES. | | |
|---|---|---|---|
| COMPOUND | MONOMERS PMDA/3F/PA | Tg °C. (5% offset) | % WT. RETENTION (650° F.-100 HRS) |
| 1 | a. n = 40 | 396 (366) | 98 |
| | b. n = 20 | 382 (348) | 98 |
| | c. n = 10 | 356 (325) | 99 |
| | d. n = 5 | 344 (306) | 98 |
| | e. n = 2 | 293 (293) | 92 |
| | f. n = 1 | 274 (274) | 83 |
| 2 | 6F/3F/PA n = 25 | 300 (276) | 99 |
| 3 | BTDA/3F/PA n = 32 | 331 (289) | 98 |
| 4 | ODPA/3F/PA n = 33 | 309 (288) | 93 |
| 5 | BPTDA/3F/PA n = 35 | 364 (322) | 99 |
| 6 | DPSA/3F/PA n = 30 | 401 (316) | 95 |
| 7 | PMDA/FOD/PA n = 28 | 415 (no offset) | 87 |
| 8 | 6F/FOD/PA n = 20 | 420 (383) | 97 |
| 9 | BTDA/FOD/PA n = 24 | 417 (374) | 94 |
| 10 | ODPA/FOD/PA n = 24 | 411 (366) | 93 |
| 11 | BPTDA/FOD/PA n = 25 | 427 (380) | 97 |

The processing temperature of a polyimide of the invention is directly affected by the molecular weight of the imidized polymer. We define processing temperature as the lowest temperature at which the imidized polymer will flow as a viscoelastic liquid under moderate (1000 psi) pressure. Control of molecular weight is achieved by selecting a ratio of reactants to obtain a selected number of repeated units, as demonstrated in example 3-8 above. Linear polyimides are obtained by using non-reactive end-caps such as phthalic anhydride. Crosslinkable polyimides are obtained by using reactive end-caps such as nadic anhydride. To demonstrate processability, the following procedures were used.

Polyimide solutions (40 weight % solids in N-methyl pyrrolidone(NMP)), were coated onto style 120 fiberglass cloth swatches, each a 3"×5" rectangle, to a dried film thickness of 0.007 inches. The coatings were applied with a camel hair brush onto the fiberglass cloth, which was horizontally supported on non-porous FEP coated fiberglass release sheet (6 mil ARMALON). The coated cloth was dried and imidized in a circulating air oven for 30 minutes at 150° C., 30 minutes at 175° C., and 30 minutes at 215° C.

One-inch squares of each supported, imidized film were placed between cold rolled steel plates. Before placement of the second CRS plate, the squares were covered with aluminum foil which had been coated with release agent (FREKOTE 44). This enables plate separation for flow observation after each processing attempt. The assemblies were transferred to a hydraulic press that had been preheated to a selected temperature, and pressure of 1000 psi was applied. After 10 minutes the press was shut off and allowed to cool to 100° C. below the processing temperature, and the plates were removed. The plates were allowed to cool to room temperature. Then the plates were separated and the aluminum foil was removed for observation to see if viscous flow had occurred. This procedure was repeated at progressively higher press temperatures until viscous flow of resin from the compressed film was observed. The increase in press temperature for each successive test was 28° C. The processing temperature for a resin was the lowest press temperature at which resin flow from a compressed film of that resin was observed.

The lower the number of repeated units in the imidized polyimide (lower molcular weight), the lower will be the processing temperature for that polyimide. Thus, processing temperatures can be controlled to suit various polyimide applications. The number of repeated units in polyimides of the invention may range from $n=1$ to $n=100$.

EXAMPLE 10

The procedures described above were followed to determine processing temperatures for several polyimide resins of the invention. The resins that were tested were:

The PMDA/3F resin described in Example 1 (Compound 1 in Table 1);

the PMDA/3F/PA resins described in Example 9 having $n=40$, $n=20$ and $n=10$ (Compounds 1a., 1b., and 1c. in Table IV); and the PMDA/3F/NA resins described in Examples 3 and 4 having $n=2$, $n=5$, and $n=10$ (Compounds 1a.,1c., and 1d. in Table II).

Results of the tests are tabulated in Table V.

TABLE V

| MOLE RATIO | | | | REPEATED UNITS (n) | ESTIMATED MOL. WT. | PROCESSING TEMP. °C. |
| --- | --- | --- | --- | --- | --- | --- |
| PMDA | 3F | PA | NA | | | |
| 1 | 1 | | | INDEF. | INDEF. | >454 |
| 40 | 41 | 2 | | 40 | 15,000 | 441 |
| 20 | 21 | 2 | | 20 | 7,500 | 399 |
| 10 | 11 | 2 | | 10 | 4,000 | 316 |
| 10 | 11 | | 2 | 10 | 4,000 | 427 |
| 5 | 6 | | 2 | 5 | 2,000 | 371 |
| | 3 | | 2 | 2 | 2,000 | 260 |

EXAMPLE 11

Polyimide BTDA/3F/PA was made by the procedure described in Example 9, with 40 repeated units. Its performance in the processability test described above was compared with that of a resin of BTDA/3F with no endcap and uncontrolled molecular weight obtained by the procedure described in Examples 1 and 2. The resin of uncontrolled molecular weight was not processable at temperatures up to 427° C. The phthalic endcapped resin was processable at 288° C.

EXAMPLE 12

Polyimide 6 F/3F/PA was made by the procedure described in Example 9, with 40 repeated units. Its performance in the processability test described above was compared with that of a resin of 6 F/3F with no endcap and uncontrolled molecular weight obtained by the procedure described in Examples 1 and 2. The resin of uncontrolled molecular weight was processable at 316° C. The phthalic endcapped resin was processable at 260° C.

EXAMPLE 13

The uncured resin PMDA/3F/NA ($n=2$) described in Example 3 was made up in a solution of 40% resin in N-methylpyrrolidone. This solution was used in the test for adhesive strength of the resin. Coupons were cut to size 10.2 cm × 12 cm from a sheet of titanium alloy (6 Al 4 V) of 1.27 mm thickness. The coupons were overlapped at their edges to make a lap seam 12.7 mm wide. The overlap surface on each coupon was brushed with a coat of the resin solution to film thickness about 150 microns. A glass fiber scrim was placed on the coated surface of one of the coupons along the seam to control the bond line thickness to about 100±25 microns. The coated coupons were dried for 30 min. at 100° C. in air, then 30 min at 150° C., then 30 min at 210° C. The coupons were then joined at the seam and the assembled panel was placed in a press which was preheated to 200° C. Two tons force was applied to the press. The temperature was then raised to 320° C. over ½ hour and held at that temperature for two hours. The press was then cooled to 150° C. before the panel was removed. The panel was post-cured at 371° C. for 90 minutes in a circulating air oven. Specimens for testing were made and tested according to ASTM test method D 1005 for lap shear strength. Two specimens tested at 23° C. had lap shear strength of 1.56 ksi and 1.67 ksi. Another specimen tested at 375° C., after holding at that temperature for five minutes, had lap shear strength of 2.62 ksi.

EXAMPLE 14

A composite panel was prepared from the resin PMDA/3F/NA, $n=2$, prepared as described above in Example 3. A 37% by wt solution of the resin in NMP was made. To make prepregs, the selected fibrous reinforcing fabric was Celion 3k70P carbon fiber with standard epoxy sizing (obtained form BASF-Celion Inc.). Three pieces of this fabric, each 13 by 13 inches were impregnated with 80 grams of the resin solution. The impregnated fabric was dried in a circulating air oven for 1 hour at 50° C., 1 hour at 100° C., ½ hour at 150° C. and 1 hour at 225° C. to remove the solvent. Twelve plies of this prepreg, each 6×6 inches, were cut and stacked. Two bleeder plies of 7781 glass fabric were placed upon the stack, with a ply of porous release film in between. The prepreg stack was vacuum bagged for autoclave cure, and the following cure cycle was used:
(1) From 23° C. to 220° C., under full vacuum, in one hour.
(2) Hold 90 minutes at 220° C., full vacuum.
(3) Raise to 315° C. in one hour, adding 200 psi hydrostatic pressure when the temperature passes 230° C.
(4) Hold at 315° C., full vacuum, 200 psi, for three hours.
(5) Cool to 23° C. in two hours.

The laminated composite panel was removed and postcured in air for 12 hours at 315° C. Microscopic examination of a polished cross section of the laminate revealed a well consolidated, void free laminate. The resin content of the laminate was calculated to be approximately 50% on a weight basis. A laminate specimen measuring 3×0.4 inches was cut and Dynamic Mechanical Analysis was performed to determine the laminate's glass transition temperature, Tg. The Du Pont 982 DMA was used at a test span of 1.7 inches, an oscillation amplitude of 0.1 mm, and a heating rate of 5° C./min. The Tg of the laminate was measured to be 397° C. by the maximum in tan delta, and 359° C. by the 5% modulus offset criterion, which is the temperature at which the specimen modulus is offset by 5% from a tangent drawn to the initial modulus slope. Comparatively, the state of the art PMR-15 material, cured in the same manner, exhibits Tg significantly lower, with a maximum tan delta at 361° C. and a 5% offset at 306° C.

EXAMPLE 15

The polyimide resin PMDA/3F/PA n=40 was prepared as described in Example 9 above. The solids content of this solution was approximately 40%. Adhesive joints were prepared for lap shear strength testing using Ti (6 Al 4 V) substrates. The panel preparation procedures were identical to those in Example 13 above. The panels were consolidated by insertion into a press that was preheated to 450° C., and applying two tons pressure immediately. The press heaters were turned off after 1 minute, and the assembly was allowed to cool to 100 degrees C. without active cooling, while pressure was maintained.

Lap shear specimens were prepared and tested according to ASTM test method D 1005. The 23° C. lap shear strengths of two of the specimens were 1.24 and 1.33 ksi. The lap shear strength of one specimen tested at 371° C. after a five minute soak at temperature, was 2.61 ksi. The lap shear strength of one specimen tested at 23° C., after aging for 100 hours in a circulating air oven at 371° C., was 1.03 ksi.

EXAMPLE 16

A composite panel was prepared from the PMDA/3F/PA n=40 prepared as described in Example 9 above. The fibrous reinforcement and the impregnating procedures were the same as in Example 14. The impregnated fabric was dried in a circulating air oven for ½ hour at 50° C., 1 hour at 100° C., ½ hour at 150° C., 1½ hours at 220° C. and 30 minutes at 300° C. Twelve plies of the prepreg, each 3¼×2 inches were cut and stacked. A piece of 0.005 inch thick polyimide film (KAPTON) treated with release agent was placed on either side of the stack. The stack was inserted into a press that was preheated to 450° C. The press was closed to contact pressure. After 3 minutes and 40 seconds at contact pressure, 4 tons of pressure was applied. After 10 minutes at 450° C., 4 tons pressure, the press was shut of and the composite was allowed to cool under pressure to 300° C. without active cooling, and then was removed and cooled to 23° C. in 30 minutes.

Tg and short beam shear specimens were prepared and then postcured 12 hours in a circulating air oven at 371° C.

Microscopic examination of a polished cross section of the composite revealed a well consolidated structure with less than 1% void content. The laminate resin content was calculated to be approximately 50% on a weight basis. The Tgs of this laminate, evaluated as in Example 14, were determined to be 412° C. by the tan delta peak and 382° C. by the 5% modulus offset criterion. For comparison, a laminate made according to manufacturer's instructions from the state of the art Avimid N (Dupont) resin had Tgs of 380° C. at the tan delta maximum and 330° C. at the 5% modulus offset. Short beam shear specimens were cut from the composite and tested following ASTM test method D 2144. The span/thickness ratio was 4:1 and the specimen width was ⅜ inch. Two specimens each were run at three test conditions, with the results averaged below. For comparison, measured values for the state of the art PMR-15 and Avamid N systems on the same fabric are included.

| CONDITIONING | TEST TEMP. °C. | SHORT BEAM SHEAR STRENGTH | | |
|---|---|---|---|---|
| | | PMDA/3F/PA | PMR-15 | AVAMID N |
| NONE, DRY | 23 | 11.3 ksi | 8.6 ksi | 7.5 ksi |
| NONE, DRY | 315 | 7.6 | 4.1 | 3.1 |
| NONE, DRY | 371 | 4.1 | 1.1 | 1.3 |

The weight loss upon aging was 2.6. This compares to 14.4 for the PMR-15 composite and 6.0 for the Avimid N composite after the same conditioning experience. The weight loss data was obtained by using short beam shear specimens whose dimensions were nominally 0.75×0.375×0.1 inches. The specimens were dried in an oven for 24 hours at 110° C. and then weighed to determine the initial specimen weight. Each set of three to five specimens were placed in a 4 dram glass vial which was then heated in a circulating air oven at 371° C. for 100 hours. The specimens were removed from the oven, allowed to cool to room temperature, and reweighed.

EXAMPLE 17

The polyimide resin composition 6 F/FOD/PA n=20 was prepared as described in Example 9 above. Adhesive joints were prepared for lap shear strength testing using Aluminum 2024 T3. The substrate thickness was 0.062 inches and the test panel sizes were 6×6 inches. The bondline overlap area was 0.5 inches. The substrates received a surface preparation of solvent degreasing followed by a standard sulfuric acid-sodium dichromate treatment (FPL etch). Style 122 E glass scrim cloth was used to control bondline thickness to between 0.003 and 0.005 inches. The overlap areas of the substrates to be bonded were coated to a film thickness of approximately 0.006 inches by brushing on the polyimide solution. A piece of the scrim material was placed over the coated area of one of the substrate panels and the panels were dried in a circulating air over at 140° C. The temperature was raised gradually to 230° C. over 2 hours and held at 230° C. for one hour. The panels were then assembled and placed in a press that was preheated to 100° C. The temperature was increased gradually over 45 minutes, to 371° C. with 1 ton pressure being applied and maintained when the press temperature reached 250° C. The panel was kept at 371° C. under 1 ton pressure for two hours, then cooled under pressure to 200° C. without active cooling, then removed. Lap shear specimens were prepared and tested according to ASTM test method D 1005. The 23° C. lap shear strengths measured for two specimens were 1.72 ksi and 1.70 ksi. The 315° C. lap shear strengths measured for two specimens were 1.47 ksi and 1.40 ksi.

EXAMPLE 18

A polyimide resin composition BPTDA/FOD/PA n=25 was prepared as described in Example 9. Adhesive joints were prepared for lap shear strength testing using the same substrates, preparation and drying procedures described in Example 12. The panels were consolidated by introducing the assembly into a press preheated to 100° C. The temperature was increased, at press rate, to 315° C. with 1 ton pressure being applied and maintained when the press temperature reached 250° C. The panel was kept at 315° C. under 1 ton pressure for one hour. The panel was heated at press rate to 343° C. and held, under pressure, for two hours. The press was shut off and the panel cooled, without active cooling, under pressure to 150° C. before removal.

Lap shear specimens were prepared and tested according to ASTM test method D 1005. Lap shear strength measured at 23° C. for two specimens were 2.25 ksi and 2.23 ksi. Lap shear strengths measured at 315° C. for two specimens were 1.66 ksi and 1.58 ksi.

We claim:

1. A polyimide resin made by reaction of a dianhydride, its diester or tetracid derivative having at least one aromatic ring in the molecule and a bis(trifluoromethyl) oxydianiline.

2. A polyimide resin defined by claim 1 wherein the bis(trifluoromethyl) oxydianiline is 4,4'(2,2' trifluoromethyl) oxydianiline.

3. A polyimide resin defined by claim 2 wherein the dianhydride is a member selected from the group consisting of pyromellitic dianhydride, 2,2-bis(3,4-dicarboxyphenyl) hexafluoropropane dianhydride, 3,3',4,4'-benzophenone tetracarboxylic dianhydride, 3,3',4,4'oxydiphthalic anhydride, 3,3',4,4'-diphenyl tetracarboxylic dianhydride, and 3,3',4,4'-sulfonyldiphthalic anhydride.

4. A polyimide resin defined by claim 1 wherein the diester is selected from the group of pyromellitic diester and 3,3',4,4'-benzophenone tetracarboxylic diester.

* * * * *